United States Patent
Kobayashi et al.

(10) Patent No.: US 6,613,260 B2
(45) Date of Patent: Sep. 2, 2003

(54) PROCESS FOR MAKING ELASTICALLY STRETCHABLE COMPOSITE SHEET

(75) Inventors: Toshio Kobayashi, Kagawa-ken (JP); Hiroyuki Ohata, Kagawa-ken (JP); Masaki Yoshida, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 301 days.

(21) Appl. No.: 09/815,399

(22) Filed: Mar. 22, 2001

(65) Prior Publication Data

US 2002/0053755 A1 May 9, 2002

(30) Foreign Application Priority Data

Mar. 31, 2000 (JP) ........................... 2000-099494

(51) Int. Cl.[7] ............... B29C 47/06; B29C 55/06; B32B 5/24
(52) U.S. Cl. ............ 264/171.13; 156/167; 156/178; 156/229; 156/290; 264/288.4
(58) Field of Search ............. 264/171.13, 288.4; 156/167, 178, 229, 290

(56) References Cited

U.S. PATENT DOCUMENTS

| 4,720,415 A | 1/1988 | Vander Wielen et al. |
| 5,910,224 A | 6/1999 | Morman |

FOREIGN PATENT DOCUMENTS

| EP | 1 054 092 A1 | 11/2000 |
| EP | 1 066 961 A1 | 1/2001 |
| EP | 1 138 473 A1 | 10/2001 |
| EP | 1 138 475 A2 | 10/2001 |

OTHER PUBLICATIONS

European search report mailed Apr. 25, 2002.

Primary Examiner—Leo B. Tentoni
(74) Attorney, Agent, or Firm—Butzel Long

(57) ABSTRACT

A composite web including an elastically stretchable web and an inelastically stretchable web bonded together is stretched on a course defined between at least two nip roll pairs to obtain an elastically stretchable composite sheet. The composite web is brought into contact with a peripheral surface of at least one roll of each nip roll pair over an area of the peripheral surface defined by a quadrant of this roll's circular cross section.

3 Claims, 4 Drawing Sheets

PROCESS FOR MAKING ELASTICALLY STRETCHABLE COMPOSITE SHEET

BACKGROUND OF THE INVENTION

This invention relates to a process for making an elastically stretchable composite sheet which is suitable, for example, for a topsheet of a sanitary article such as a disposable diaper, a menstruation pad or the like.

An elastically stretchable composite sheet for a topsheet of a sanitary article is well known which comprises an elastically stretchable sheet and an inelastically stretchable sheet-like fibrous assembly bonded to each other. An example of the process for making such a composite sheet of prior art comprises steps of bonding the elastically stretchable web and the inelastically stretchable web made of fibrous assembly to each other intermittently in one direction, stretching the elastically stretchable web in the one direction together with the inelastically stretchable web and relieving this composite web of tension so that the composite web may contract substantially to its initial length under a contractile force of the elastically stretchable web.

The composite sheet obtained in this manner can eliminate a rubber-like touch by covering the elastically stretchable sheet having such uncomfortable touch with the inelastically stretchable fibrous assembly free from such touch. Furthermore, such composite sheet contracts with component fibers of the fibrous assembly remaining stretched and therefore a bulkiness increases as it contracts. This means that the composite sheet covered with the fibrous assembly can offer a comfortably soft touch.

However, the process for making the composite sheet is accompanied with a problem that both the elastic web and the inelastic web are deformed as these webs are stretched in the one direction. Such deformation reduces dimensions of these webs as measured orthogonally to the direction of stretching. During this deformation, a stretching ratio of the component fibers in the fibrous web remarkably increases along side edges of this web extending in the direction of stretching but not in its intermediate zone. Consequently, in the composite sheet obtained by this process, a bulkiness of the inelastic web comprising the fibrous assembly can not be uniform transversely thereof.

SUMMARY OF THE INVENTION

It is an object of this invention to provide a process for making the composite sheet enabling the inelastic web in the form of fibrous assembly to have a uniform bulkiness in the composite sheet including such inelastic web.

According to this invention, there is provided a process for making an elastically stretchable composite sheet comprising an elastically stretchable web having upper and lower surfaces and being continuous in one direction and an inelastically stretchable web made of stretchable continuous fibers and being continuous in the one direction, the inelastically stretchable web being bonded to at least one of the upper and lower surfaces of the elastically stretchable web, the process comprising the steps of stretching this composite web in the one direction and leaving the composite web contract under contractile force of the elastically stretchable web to obtain the composite sheet adapted to be more than the composite web.

The process for making an elastically stretchable composite sheet further comprises the composite web being continuously fed in the one direction to at least two nip roll pairs adapted to rotate at a peripheral speed increasing ahead with respect to a machine direction, the stock web being brought into contact with peripheral surfaces of each nip roll pair so that, in at least one roll of each roll pair, the composite web is brought into contact with this roll over an area of its peripheral surface defined by a quadrant of its circular cross section or larger area until the composite web is stretched to a desired ratio.

DETAILED DESCRIPTION OF THE PREFERRED EMBODIMENTS

A process for making an elastically stretchable composite sheet according to this invention will be described more in detail with reference to the accompanying drawings.

Figure 1:
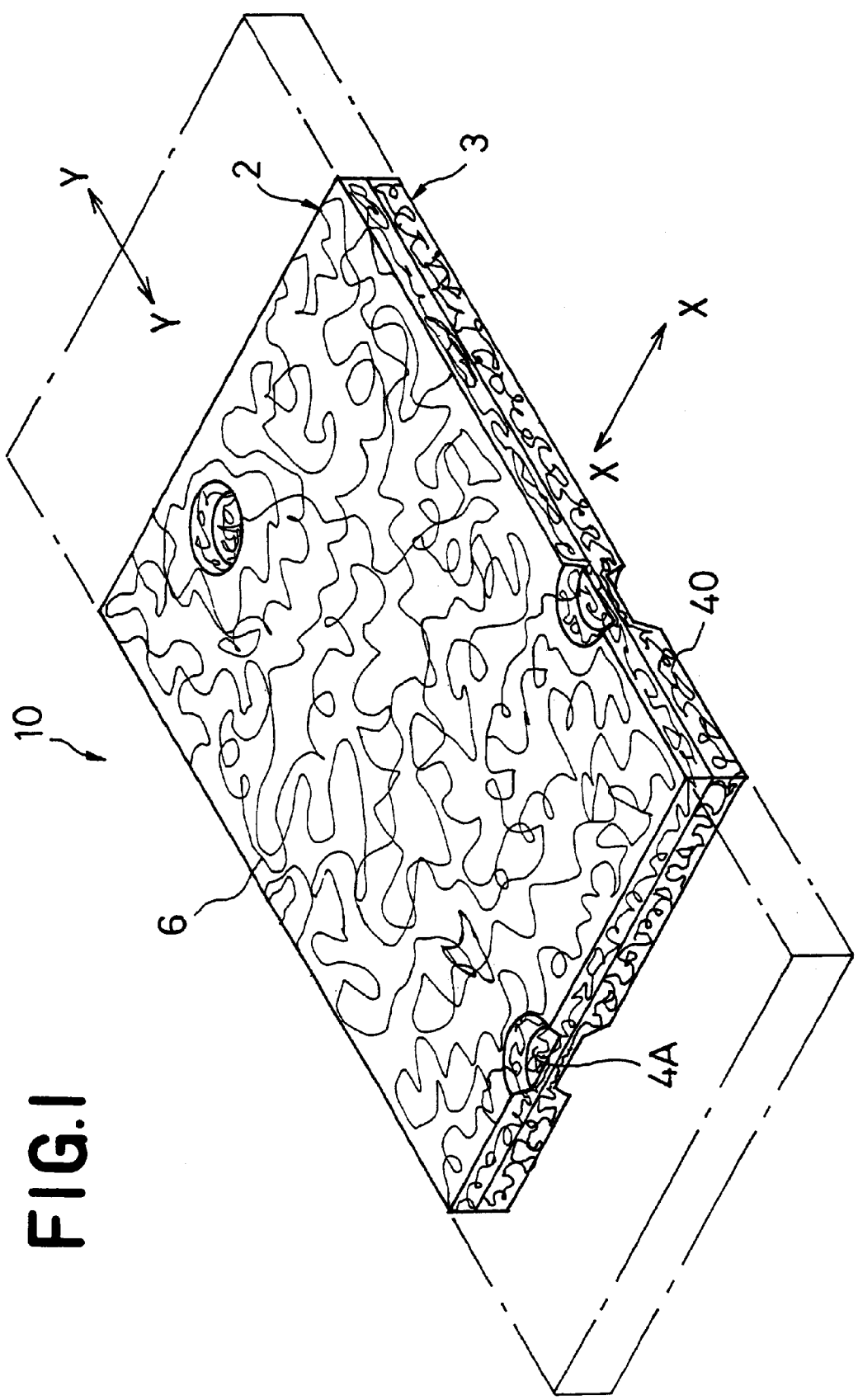
FIG. 1 is a fragmentary perspective view of a stock sheet used in a process according to this invention.
Figure 2:
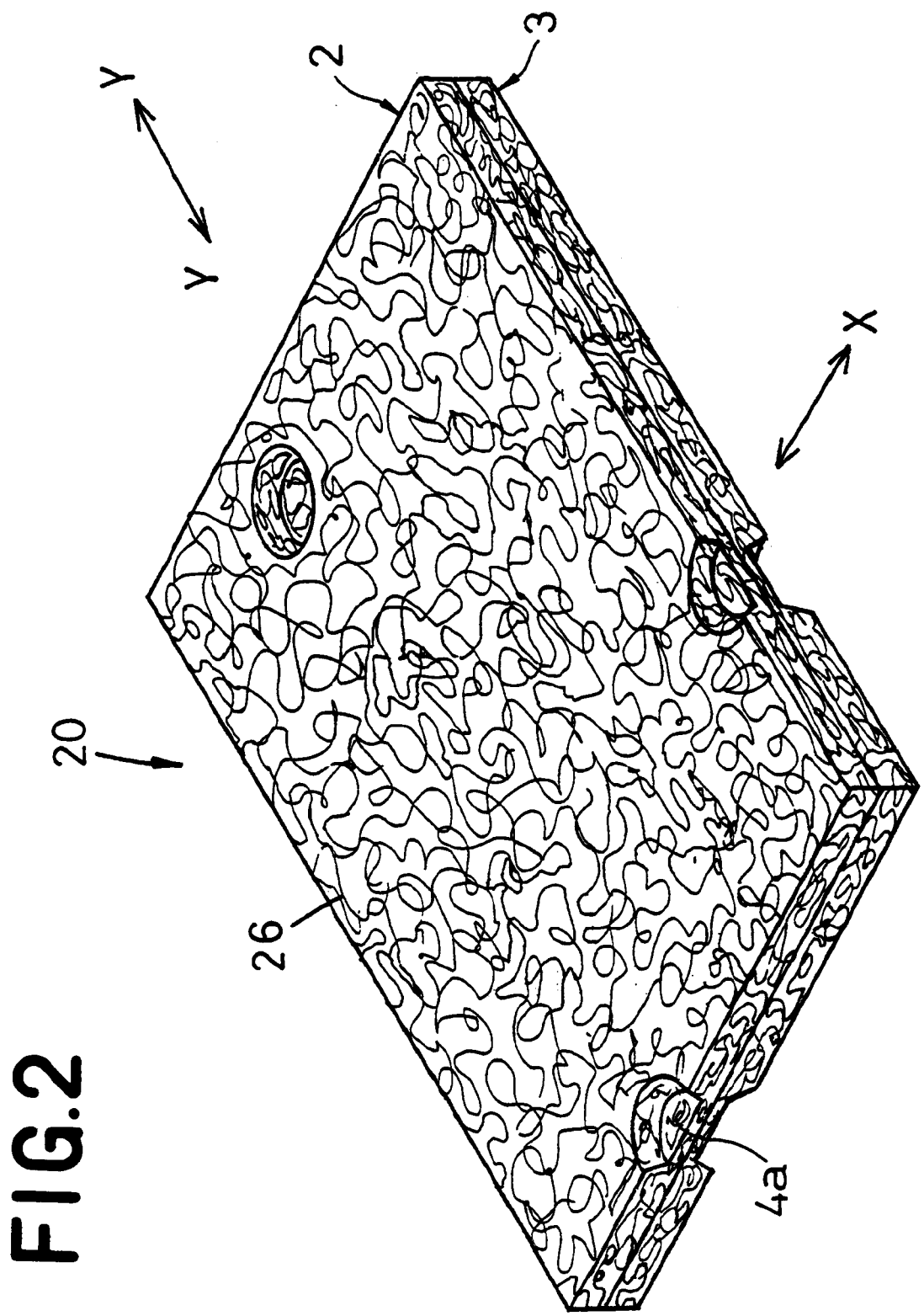
FIG. 2 is a fragmentary perspective view of a composite sheet obtained by the process according to this invention.

FIG. 1 is a fragmentary perspective view of a stock web 10 used in the process according to this invention and FIG. 2 is a fragmentary perspective view of a composite sheet 20. The stock web 10 comprises a stretchable web 2 formed with inelastically stretchable continuous fibers 6 oriented at random and an elastic web 3 formed with elastically stretchable continuous fibers 40 oriented at random, the webs 2, 3 being placed upon and bonded to each other at bonding spots 4A. The stock web 10 formed in this manner is elastically stretchable in X-direction and Y-direction orthogonal thereto, at least in Y-direction as indicated by chain lines. In the composite sheet 20, the continuous fibers 6 depicted in FIG. 1 are in slackened state between each pair of the adjacent bonding spots 4A, 4A. The fibers 6 in such stretched state are designated by reference numeral 26. The composite sheet 20 can be stretched in Y-direction under tensile force lower than that required by the stock web 10.

Figure 3:
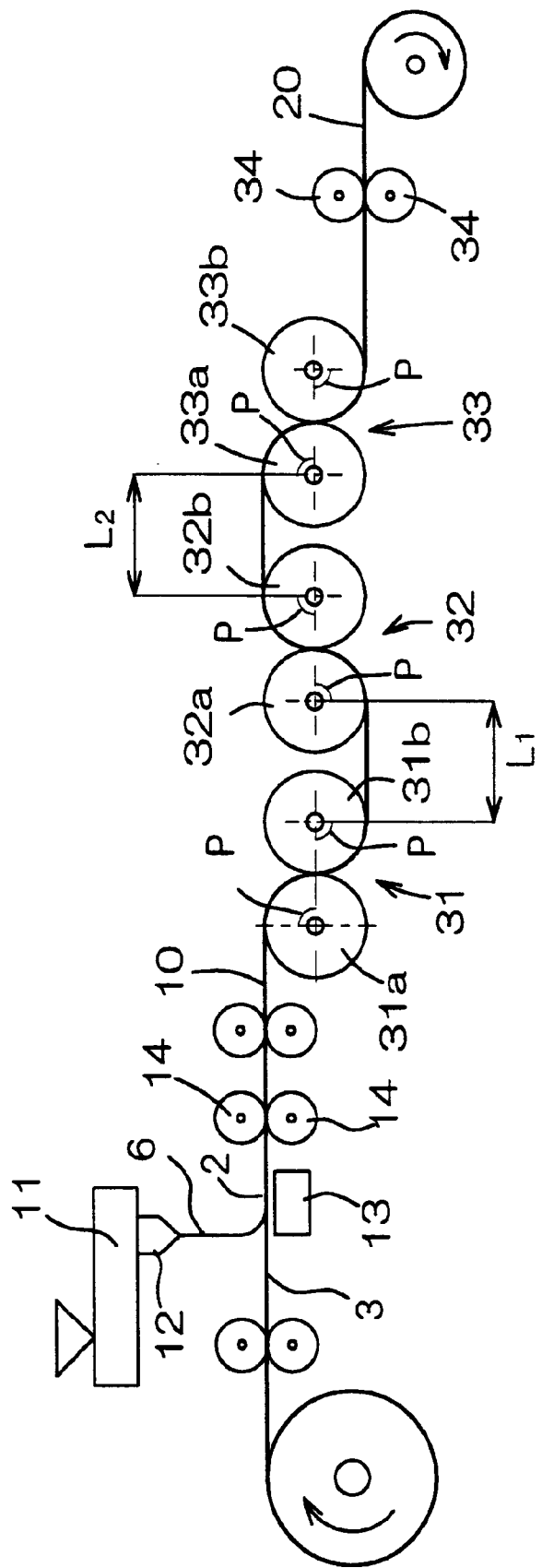
FIG. 3 is a diagram illustrating the process for making the composite sheet.

FIG. 3 is a diagram illustrating a process for making the composite sheet 20 from the stock web 10, in which exact relative sizes of respective devices or means are disregarded. In this process, the elastic web 3 is continuously fed from the left side as viewed in FIG. 3. A melt extruder 11 includes a plurality of nozzles 12 arranged transversely of the elastic web 3 and these nozzles 12 discharge a plurality of the continuous fibers 6 onto the upper surface of the elastic web 3 under effect of hot air (not shown) blown against these fibers 6. Immediately below the nozzles 12, there is provided a suction box 13 with the elastic web 3 and a conveyor belt (not shown) for the elastic web 3 being interposed therebetween. The continuous fibers 6 are collected on the upper surface of the elastic web 3 immediately below the nozzles 12 under a suction effect provided by the suction box 13 to form the stretchable web 2. The stretchable web 2 and the elastic web 3 are fed together into a nip defined between a pair of embossing rolls 14, 14 whereupon the bonding spots 4A of FIG. 1 are formed by means of which these two webs 2, 3 are integrated to form the stock web 10 of FIG. 1.

The stock web 10 then passes first, second and third nip roller pairs 31, 32, 33 arranged in this order along a machine direction. The first~third nip roller pairs 31~33 respectively comprise pairs of the rolls 31a, 31b; 32a, 32b; 33a, 33b and the rolls of each pair are adapted to rotate at the same peripheral speed. And the first~third nip rolls 31~33 are adapted to rotate at their peripheral speeds progressively increasing ahead with respect to the machine direction. In the course of passing these nip rolls 31~33, the stock web 10 is stretched up to a desired stretch ratio in the machine direction. In the stock web 10 stretched in this manner, the stretchable web 2 is inelastically stretched and the component fibers 6 thereof are changed to finer and longer fibers 26 (See FIG. 2). Simultaneously, the elastic web 3 is elastically stretched. The stock web 10 having left the third nip rolls 33 then passes a feed roll pair 34 rotating at the same peripheral speed as the first nip rolls 31 and taken-up on a reel. The stock web 10 once having been stretched contracts again before it reaches the fee roll pair 34. More specifically, the elastic web 3 elastically contracts substantially to its initial dimension and forces the stretchable web 2 to contract with formation of many gathers and loops between each pair of the adjacent bonding spots 4A, 4A. In this way, the composite sheet 20 of FIG. 2 is obtained from these two webs 2, 3.

In the process as has been described above, the stock web 10 is brought into contact with peripheral surfaces of each nip roll pair so that, in at least one roll of each roll pair, the stock web 10 is brought into contact with this roll over an area of the peripheral surface defined by a quadrant of its circular cross section or larger area. Referring to the diagram illustrating a specific embodiment of the process, the stock web 10 is brought into contact with the respective rolls 31a, 31b of the first nip roll pair 31 so that an included angle P of 90° or more may be established. In other words, the stock web 10 is fed forward in contact with each of the rolls 31a, 31b over the area defined by a quadrant of its circular cross section. Such unique manner in which the stock web 10 is brought into contact with the first~third nip rolls 31~33 generates a friction enabling the stock web 10 to be stretched in the machine direction without contracting transversely of the stock web 10. In this way, the stock web 10 is stretched at a uniform ratio over its full width. The angle P determining the result of stretching is preferably in a range of 90~270° to at least one of the rolls 31a, 31b. Referring to FIG. 3, a dimension L along which the stock web 10 is in contact with none of the nip rolls in the course of stretching. This dimension is designated by $L_1$ between the first nip roll pair 31 and the second nip roll pair 32 and designated by $L_2$ between the second nip roll pair 32 and the third nip roll pair 33.

Figure 4:
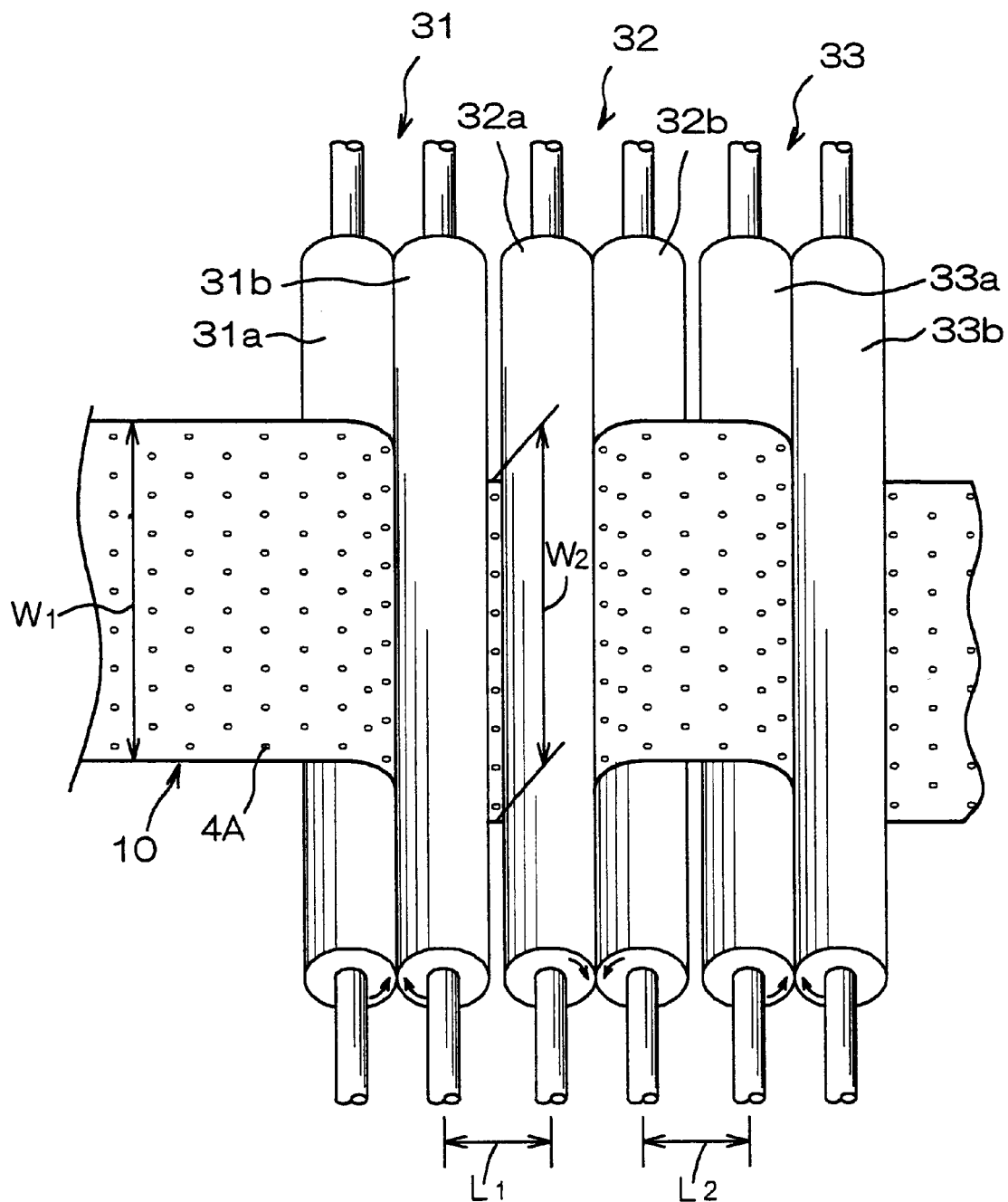
FIG. 4 is a plan view partially depicting the process for making the composite sheet.

FIG. 4 is a plan view depicting the first~third nip roll pairs arranged in the order illustrated by FIG. 3. The stock web 10 fed forward from the left side as viewed in FIG. 3 has already been formed by the embossing rolls 14 with the bonding spots 4A. In this step, the stock web 10 has a width $W_1$ and then passes the first nip roll pair 31 and the second nip roll pair 32. The distance L along which the stock web 10 is in contact with none of the nip rolls is designated by $L_1$ between the first nip roll pair 31 and the second nip roll pair 32. According to this invention, two nip roll pairs adapted to rotate at their peripheral speeds different depending on the particular pairs, i.e., the first and second nip roll pairs 31, 32 are closed arranged so that $L_1/W_1=0.01~0.4$ may be established. Thereby it is possible to minimize an anxiety that the width W of the stock web 10 might be reduced between these two nip roll pairs, i.e., in the course along which the stock web 10 is in contact with none of the nip rolls 31a~32b. L/W<0.01 would deteriorate a workability because the first and second nip roll pairs 31, 32 are too closely arranged while L/W>0.4 would unacceptably reduce the width of the stock web 10.

Also for a distance by which the third nip roll pair 33 is spaced apart from the second nip roll pair 32. Assumed that the stock web 10 has a width $W_2$ immediately before it enters the second nip roll pair 32 and the distance L along which the stock web 10 is in contact with none of the nip rolls is designated by $L_2$ between the second nip roll pair 32 and the third nip roll pair 33, the second and third nip roll pairs 32, 33 are arranged closely to each other so that $L_2/W_2=0.01~0.4$ may be established.

It is possible without departing from the scope of this invention to stretch the stock web 10 by only two nip roll pairs 31a~32b or by four or more nip roll pairs. It is also possible without departing from the scope of this invention to use the stock web 10 comprising the elastic web 3 and a pair of stretchable webs 2 bonded to opposite surfaces of the elastic web 3. The elastic web 3 may be formed from a web made of styrene-based elastomeric threads or a film of such elastomer. The stretchable web 2 may be formed from a web made of continuous fibers of homo- of copolymer of propylene. It is possible, if desired, to provide the peripheral surface of each nip roll with suitable means to prevent the stock web 10 from slipping transversely thereof. Such means include a roughing of the peripheral surface or coating of the peripheral surface with rubber sheet or the other slip-proof material.

The process according to this invention for making an elastically stretchable composite sheet prevents the stock sheet from being reduced transversely thereof in the course of stretching the stock sheet using a plurality of nip roll pairs. This is because that the stock sheet is brought in contact with these nip roll pairs over a relatively large area. Furthermore, the nip roll pairs arranged closely one to another so that the distance along which the stock sheet would otherwise be stretched without being brought into contact with the nip roll pairs can be minimized. This is another factor functions to prevent the stock sheet from shrinking transversely thereof and to assist the stock sheet to be evenly stretched over its full width.

What is claimed is:

1. A process for making an elastically stretchable composite sheet which comprises the steps of:

providing a composite sheet comprising an elastically stretchable web having upper and lower surfaces and being continuous in one direction and an inelastically stretchable web made of stretchable continuous fibers and being continuous in said one direction, said inelastically stretchable web being bonded to at least one of said upper and lower surfaces of said elastically stretchable web;

continuously feeding said composite sheet to at least two nip roller pairs which rotate at peripheral speeds that increase along a direction in which the composite sheet moves; and bringing the composite sheet into contact with peripheral surfaces of each of the nip roller pairs so that, of at least one roller of each roller pair, said composite web is brought into contact therewith over at least an area of its peripheral surface defined by a quadrant of its circular cross section until said composite web is stretched a predetermined amount.

2. The process according to claim 1, wherein the at least two nip roller pairs comprise first and second nip roller pairs that are arranged closely to each other in said one direction so that a relationship of L/W=0.01~0.4 is established wherein L designates a distance between said first and second nip roller pairs along which said composite web is brought into contact therewith and W designates a width which said composite web has immediately before said composite web enters said first nip roller pair.

3. The process according to claim 1, wherein said stretchable web is formed from a web made of continuous fibers of homopolymers or copolymers of propylene.

* * * * *